United States Patent Office 3,522,171
Patented July 28, 1970

3,522,171
SEWAGE SLUDGE TREATMENT PROCESS
Milton Spiegel, Los Angeles, and M. Floyd Hobbs, Monte Sereno, Calif., assignors to FMC Corporation, a corporation of Delaware
No Drawing. Filed Jan. 27, 1969, Ser. No. 794,373
Int. Cl. C02c 1/06
U.S. Cl. 210—6                                        8 Claims

ABSTRACT OF THE DISCLOSURE

This invention deals with a method of treating sludge to reduce the phosphate content thereof prior to recycling the sludge as seed material to the aeration zone of an activated sludge sewage treatment system. The method involves subjecting the first sludge concentrate produced in the separator successively to acidification followed by separation of a second sludge concentrate and then to dilution with a low phosphate content aqueous medium followed by separation of the third sludge concentrate which is the reduced phosphate content concentrate of microoganisms to be recycled.

---

This invention relates to the treatment of sewage wastes. More particularly, it relates to a process for treatment of activated sludge. Still more particularly, it relates to a process for producing a concentrate of sludge, which is markedly reduced in phosphate content, for recycle to the aeration zone where the phosphate depleted sludge will induce incorporation of the phosphates present in influent sewage into the solids formed in the mixed liquor.

In accordance with this invention, a sludge treatment system is provided which when combined with activated sludge sewage treatment systems, produces a sludge depleted of phosphate content for recycle to the aeration zone whereby phosphorus materials, hereinafter referred to as phosphates because that is the predominant component, are taken up as an integral part of or become associated with the solids content of the mixed liquor in the aeration zone. The sludge treatment system involves subjecting a first sludge concentrate formed in the sludge separator of the activated sludge sewage treatment process successively to acidification and reconcentration to form a second sludge concentrate and dilution of the second sludge concentrate with a sufficient volume of low phosphate content and low solids content aqueous medium from the sludge separator and separation of a final concentrate of sludge of relatively low phosphate content for recycling to the aeration zone of the activated sludge process.

In the conventional activated sludge systems in use today, the sewage is subjected to the usual screening, degritting, etc., operations following which the sewage is mixed with material recycled from a settling tank and subjected to aeration. The amount of recycled sludge constitutes a volume of from about 25% to 200%, based upon the volume of incoming sewage generally having a B.O.D. in the range between about 100 mg./liter and about 300 mg./liter.

This type of treatment with continuous recycle of large volumes of sludge-containing liquids, creates a condition whereby a state of balance is established at relatively high levels of concentration for dissolved mineral elements such as phosphorus generally present in the form of anions, such as phosphate. Discharge of effluent daily from systems having a high mineral content, into receiving bodies, leads eventually to contamination of these bodies with the consequent results of promoting undesirable blooms, generating obnoxious odors, etc.

Most frequently, conventional activated sludge systems of sewage treatment reach conditions favorable to accumulation in the liquid of dissolved phosphorus-bearing material, in amounts such that the system discharges an effluent of relatively high phosphate content.

Heretofore, the accumulation of appreciable amounts of phosphate in the liquid of activated sludge systems has been recognized but since emphasis was on B.O.D. removal, a high phosphate content in the effluent was accepted as necessary. Consequently, steps were taken, only when serious conditions arose to eliminate phosphates from the plant effluent using lime, ferric chloride, and like acting chemicals.

It has been suggested that the phosphate content of sludge to be recycled in the activated sludge process, can be reduced by elutriation of the sludge with acidified water or by acidifying sludge and holding it under anaerobic conditions for a time required to form a separable phosphate enriched supernatant. Such treatments generally result in the return to the aeration tank of sludge containing about 5 to 100 mg./liter depending upon the volumes of elutriation water utilized.

Now it has been discovered, that the phosphate content of sludge being recycled in an activated sludge process can be markedly reduced. The new process eliminates treatment with large volumes of low phosphate content elutriation water. This reduces the expense of processing due to elimination of the elutriation water per se and the equipment for handling such large volumes of water as well as due to cost of after treatment to remove phosphates from the large volumes of dilute solutions. In this process, the mixed liquor is subjected to short term aeration to remove B.O.D. so that the solids are in the aeration stage a length of time which would permit hydrolysis of phosphates and their removal from the aqueous medium. Mixed liquor withdrawn from the aeration tank is subjected to a separation operation to produce an effluent containing 80% or more by volume of the inffluent flow to the settling tank and only about 10% to about 20% of the phosphate content of the flow and a sludge concentrate containing 10% to 20% by volume of the influent flow to the settling tank and 75% to 90% of the phosphate content of the flow. This first sludge concentrate is acidified to a pH in the range of 4 to 6.5 to desorb phosphates from the sludge into the liquid associated therewith and is subjected to a second concentration to produce a second sludge concentrate of at least double the solids content of said first sludge concentrate in a volume of liquid constituting 40% to 50% of the volume of the first sludge concentrate and containing 40% to 50% of the original phosphate content of the first sludge concentrate. The second sludge concentrate is mixed with, for example, between about 50% and 500% by volume based upon the volume of second sludge concentrate of effluent produced in the first separation and then the sludge is reconcentrated to an 8% to 10% solids content in a volume of liquor approximately equal to the volume of the second sludge concentrate to produce a recycle sludge which will introduce a stream of recycle sludge into the aeration tank whose desorbable phosphate content per gram of suspended solids is less than about 25% of the desorbable phosphate content per gram of suspended solids in the mixed liquor and preferably 10% or less.

More in detail, in one mode of operation, the process of removing, for example, ortho-phosphates from sludge to be recycled as seed material comprises removing mixed liquor from the aeration tank to sludge separation apparatus, removing a sludge concentrate of a solids content of about 4% from said settling tank in a liquid volume of about 10% to 15% of the volume of influent sewage, i.e., 100 g.p.m. influent sewage, and 14 g.p.m. of sludge concentrate, and having a phosphate content of, for example, 175 to 250 mg./liter, acidifying the sludge concentrate with, for example, sulfuric acid to produce a liquor with a pH of about 5, passing the acidified sludge through a second separation step where the sludge is removed from the liquor as a concentrate at a rate of about 5 gallons per minute having about 8% to 10% solids content and a phosphate content of about 175 to 250 mg./liter, mixing the flotation concentrate with an approximately equal volume of effluent from the settling tank and passing the diluted sludge through a third separation unit to produce a sludge recycle medium of 10% solids concentration, containing approximately 110 mg./liter phosphate content, at a rate of 5 gallons per minute. This concentration amounts to about 1.1 mg. of desorbable phosphate per gram of activated sludge compared to the mixed liquor content of about 6 mg. of desorbable phosplate per gram of activated sludge.

In the specific embodiment, reference is made to concentration of the sludge in a settling tank or flotation tank. It will be understood that any of the three concentrations may be effected in any of the mentioned or other rapid sludge separation apparatus such as a flotation cell, a Sweco separator and a centrifuge. A continuous screen filter which resuspends the filter cake in an aqueous medium as it is removed from the screen is particularly useful in the step for separation of the acidified sludge.

Acidification of the sludge results in densification of the sludge, in addition to causing rapid desorption of phosphates from the sludge into the liquid associated with it. This densification permits effectively concentration in a multiplicity of steps of sludge solids of approximately 3000 to 7000 mg./liter as produced by a conventional settling tank to form sludge concentrates of, for example, 10,000 to 100,000 mg./liter.

Reduction of the phosphate content of the recycled sludge concentrate to low levels is a necessity because, when the sludge and associated liquor being recycled to form mixed liquor contains analyzable amounts of phosphates, the effectiveness of sludge in tying up fresh phosphates intoduced by the incoming sewage will be reduced more or less proportionately to the desorbable phosphate content of the return sludge per unit weight of return sludge suspended solids. Thus, the amount of sludge solids required to be recycled must be proportioned to maintain an acceptable level of phosphate tie-up in the mixed liquor solids.

The invention will be further understood from the following example.

EXAMPLE

An aeration tank which may be 22 foot square and having a liquid operating depth of 14 feet 6 inches, may be arranged with an influent channel along the top of one wall of the tank with a weir arranged to provide relatively uniform distribution of influent flow along the wall. The opposite wall may be provided with five equally spaced ports for discharge of mixed liquor.

Air dispersion equipment consists of one header positioned 2 feet from the tank floor and 3 feet from the wall topped by the influent channel and a second header similarly positioned adjacent the wall provided with spaced ports. The header may support a series of horizontally projecting cord wound air disperser units each capable of introducing 5 to 8 cubic feet of air per minute.

The aeration tank is provided with about 53,000 gallons of mixed liquor having a mixed liquor sludge solids content of 5000 mg./liter. Influent sewage having a phosphate content of approximately 30 mg./liter is introduced into the tank at a rate of about 295 g.p.m. into which is also introduced about 15 g.p.m. of recycle sludge. After about 3 hours detention, mixed liquor is delivered to a settling tank which produces approximately 272 g.p.m. of effluent having a phosphate content of about 3.2 mg./liter and 38 g.p.m. of sludge concentrate having a phosphaet content of approximately 220 mg./liter.

The 38 g.p.m. of sludge concentrate is mixed with approximately 33 cc. per minute of 66° Bé. sulfuric acid and delivered to a sludge flotation tank. In this tank, the acidified liquor, after an appropriate holding time, is separated into approximately 23 g.p.m. of effluent containing approximately 220 mg./liter of phosphate and 15 g.p.m. of approximately 10% solids content sludge containing approximately 220 mg./liter of phosphate.

The 10% solids content sludge is mixed with 30 g.p.m. of effluent from the settling tank containing 3.2 mg./liter of phosphate and the diluted sludge concentrate is subjected to a second flotation operation.

The products of the second flotation can be 30 g.p.m. of a clarified liquor containing 75 m.g./liter of phosphate and 15 g.p.m. of approximately 10% solids content recycle sludge of 75 mg./liter. This content of phosphorus amounts to about 0.8 mg. of desorbable phosphate per gram of return activated sludge whereas the mixed liquor activated sludge contains about 6 mg. of desorbable phosphate per gram of sludge.

From the above example, it will be apparent that the volume of desorbed phosphate-containing aqueous medium which must be treated to precipitate phosphates before such an aqueous medium is discharged from the system, is 53 g.p.m. having an average phosphate content of about 140 mg./liter, which is to be compared to other systems where sludge washing operations will produce a representative dilute solution totaling 100 to 200 g.p.m. of liquor having a phosphate content of only 10 to 15 mg./liter.

The above-detailed description of this invention has been given by way of illustration without any intention that the invention be limited to the exact conditions set forth. No unnecessary limitations should be understood therefrom as modifications will be obvious to those skilled in the art.

We claim:

1. A process for reduction of the phosphate content of sludge being recycled in an activated sludge process which comprises separating aerated mixed liquor into a low suspended solids content first aqueous medium of relatively low phosphate content and a first solids concentrate comprising sludge rich in phosphorus-containing material, acidifying said first solids concentrate to a pH in the range between about 4 and 6.5, separating said acidified sludge concentrate into a second low suspended solids aqueous medium and a second sludge concentrate of solids content greater than that of said first sludge concentrate, mixing said second sludge concentrate with a sufficient volume of said first aqueous medium to form a diluted sludge concentrate and separating said diluted sludge concentrate into a low solids content final effluent and a final sludge concentrate of relatively low phosphate content which is the sludge to be recycled.

2. A process according to claim 1 wherein the first separation is a settling operation.

3. A process according to claim 1 wherein the first separation is a settling operation and the second and third separations are flotation operations.

4. A process according to claim 1 wherein the first separation is a settling operation, the second separation is a filtration operation and the third operation is a flotation operation.

5. A process according to claim 1 wherein the first separation segregates the mixed liquor into a first aqueous medium having a volume of 80% to 90% of the volume of the flow to the settling tank and 10% to 20% of the phosphate content of the said flow and a first solids concentrate.

6. A process according to claim 1 wherein the second separation produces a second low solids content aqueous medium with a volume of 50% to 70% of the volume of said first sludge concentrate.

7. A process according to claim 1 wherein the third separation produces a final effluent of volume at least equal to the volume of said first aqueous medium utilized to form said diluted sludge concentrate.

8. A process according to claim 1 wherein the three separation steps are flotation operations.

References Cited

UNITED STATES PATENTS

| | | | |
|---|---|---|---|
| 3,385,785 | 5/1968 | Forrest et al. | 210—6 |
| 3,386,910 | 6/1968 | Forrest | 210—6 X |
| 3,390,077 | 6/1968 | Forrest | 210—6 |

MICHAEL E. ROGERS, Primary Examiner

U.S. Cl. X.R.

210—44, 73

UNITED STATES PATENT OFFICE
CERTIFICATE OF CORRECTION

Patent No. 3,522,171                Dated July 28, 1970

Inventor(s) Milton Spiegel et al.

It is certified that error appears in the above-identified patent and that said Letters Patent are hereby corrected as shown below:

Column 1, line 22, "microoganisms" should read -- microorganisms --; line 60, after "a" cancel "B.O.D." and insert -- Biochemical Oxygen Demand (B.O.D.) --. Column 2, line 17, after "arose" insert a comma; line 45, "inffluent" should read -- influent --; line 61, after "volume", first occurrence, insert a comma; line 62, after "concentrate" insert a comma; line 61, after "volume of" insert -- the --. Column 3, line 31, "plate" should read -- phate --; line 45, "effectively" should read -- effective --. Column 4, line 14, "phaet" should read -- phate --; line 23, after "sludge" insert -- obtained in the second separation operation, --; line 27, after "flotation" insert -- , i.e., the third separation step, --; line 28, after "containing" insert -- approximately --; same line 28, the period should be deleted after the "m" and before the "g"; line 30, before the numeral "75" delete "of" and insert -- containing approximately --; same line, after "liter" and before the period insert -- of phosphate --.

Signed and sealed this 24th day of November 1970.

(SEAL)
Attest:

EDWARD M. FLETCHER, JR.                    WILLIAM E. SCHUYLER, JR.
Attesting Officer                                Commissioner of Patents